United States Patent [19]

Wheetley et al.

[11] Patent Number: 5,383,751

[45] Date of Patent: Jan. 24, 1995

[54] MANUALLY POSITIONED COMPUTER CONTROLLED DRILLING MACHINE

[75] Inventors: Michael J. Wheetley, Bedford; James W. Shelby, Duncanville, both of Tex.

[73] Assignee: Vought Aircraft Company, Dallas, Tex.

[21] Appl. No.: 102,283

[22] Filed: Aug. 5, 1993

[51] Int. Cl.$^6$ .................... B23B 35/00; B23B 45/14
[52] U.S. Cl. ................... 408/1 R; 408/13; 408/76
[58] Field of Search .............. 408/1 R, 13, 16, 76, 408/88, 110, 234, 236, 98

[56] References Cited

U.S. PATENT DOCUMENTS

| | | | |
|---|---|---|---|
| 633,882 | 9/1899 | Moissenet | 408/76 |
| 1,010,975 | 12/1911 | Stroner et al. | 408/76 |
| 3,456,738 | 7/1969 | Harry | 408/76 |
| 4,582,460 | 4/1986 | Silverberg et al. | |
| 4,613,262 | 9/1986 | Woods | 408/88 |
| 5,006,021 | 4/1991 | Wheetley | |

FOREIGN PATENT DOCUMENTS

| | | | |
|---|---|---|---|
| 2238838 | 2/1974 | Germany | 408/76 |
| 672036 | 5/1952 | United Kingdom | 408/76 |

OTHER PUBLICATIONS

Brochure, V-Scope, The Ultimate Measurement System, Celesco Transducer Products, Inc.

Primary Examiner—Daniel W. Howell
Attorney, Agent, or Firm—Richards, Medlock & Andrews

[57] ABSTRACT

A manually positioned computer controlled drilling machine (10) is disclosed for drilling a hole (12) through a surface (14). The machine includes a base (16) which is supported on a counterbalanced suspension so that an operator can manually move and shift the machine on the surface to be drilled. Automatic adjustable legs (20-26) are biased outwardly from the base by low pressure air cylinders which allows the operator to tilt and move the base (16) relative to the surface (14). This allows the operator to position the drill bit (18) over the position where the hole is to be drilled and orient the drill bit perpendicular to the surface. Caliper brakes (38) are then activated to lock the legs in place. A number of suction cup assemblies (42-52) are then sequentially moved outward into contact with the surface. A suction foot (56) on each of the suction cup assemblies is adhered to the surface by a vacuum. A double acting cylinder (62) associated with each suction cup assembly is pressurized to pull the suction foot away from the surface without pulling the foot off the surface, forcing the fixed adjustable legs to press with counteracting force on the surface and provide a stable platform for the drilling operation.

12 Claims, 2 Drawing Sheets

MANUALLY POSITIONED COMPUTER CONTROLLED DRILLING MACHINE

TECHNICAL FIELD OF THE INVENTION

This invention relates to a manually positioned drilling machine for use in drilling holes through a surface.

BACKGROUND OF THE INVENTION

In the manufacture of aircraft, it is common to drill holes through an assembly of components, such as a wing panel and subframe, to tie the assembly together by rivets or other fasteners. It is essential to drill these holes normal to the surface of the materials being drilled and to effectively drill these holes through a variety of materials, including graphite, aluminum and titanium.

A manually positioned drilling machine such as the common hand drill is difficult to position precisely on the assemblies to be drilled and to insure that the drill will penetrate the materials perpendicular or normal to the surface being drilled. A need exists for a machine which is manually operated which more efficiently and effectively drills these holes.

SUMMARY OF THE INVENTION

In accordance with one aspect of the present invention, a drilling platform is provided for drilling holes in a workpiece. The drilling platform includes a base with a drill spindle mounted on the base. A plurality of extendable support legs are biased to extend outwardly from the base and adapted to support the base with respect to the workpiece. A normalization sensor is used to determine the orientation of the base with respect to a surface of the workpiece when the plurality of extendable support legs are biased into contact with the surface. Structure is provided for locking the plurality of extendable support legs to maintain their existing degree of extension. A plurality of selectively actuatable adhesion supports are adapted to secure the base to the frame. Structure is provided for actuating a first one of the selectively actuatable adhesion supports in contact with the surface to secure the first one to a surface and for subsequently actuating at least a second one of said selectively actuatable adhesion supports in contact with said surface after said legs have been locked to secure said base to the surface. Structure is provided for retracting the actuated second one sufficiently to cause the base to press the locked support legs firmly against the surface and thereby provide a stable drilling position for the drill spindle.

BRIEF DESCRIPTION OF THE DRAWINGS

A more complete understanding of the invention will be had with reference to the following Detailed Description when taken in conjunction with the accompanying drawings, wherein.

DETAILED DESCRIPTION

Figure 1:
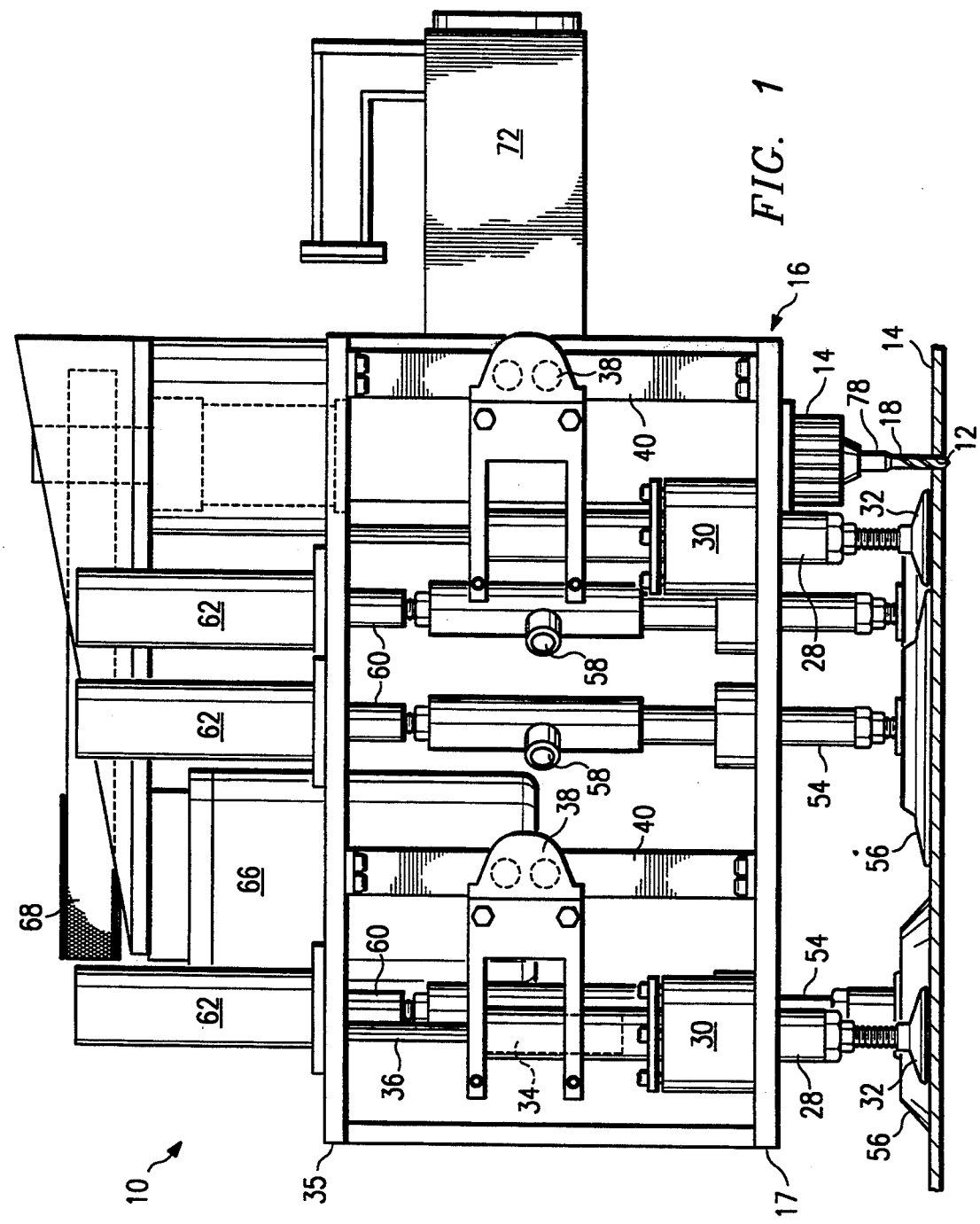
FIG. 1 is a side view of a manually positioned computer controlled drilling machine forming a first embodiment of the present invention.

With reference now to the figures, wherein like and corresponding parts throughout the several views are identified by identical reference numerals, there is illustrated a manually positioned computer control drilling machine 10 forming a first embodiment of the present invention. The machine is designed to drill holes 12 through the surface 14 of a member, which, for example, can be an air frame assembly formed of an assembly of parts made of graphite, aluminum and titanium.

The machine 10 includes a base 16 which can be suspended from an overhead crane (not shown) with a counterbalance spring to facilitate movement of the machine 10 from one location on the panel to another. For example, the crane can have a counterbalance unit which essentially compensates for the weight of the machine 10 so that the operator will have little trouble lifting and moving the machine from position to position.

To drill properly, the machine 10 must be positioned so that the drill bit 18 mounted on the machine will drill through the surface normal or perpendicular to the surface and the machine itself must form a rigid base to support the drill as it drills through the surface.

To accomplish this goal, four adjustable automatic legs 20–26 are mounted on lower plate 17 of the base 16 to support the base 16 on the surface 14. Each leg includes a hollowed out ground rod 28 which runs in a linear bearing 30 attached to the lower plate 17. The lower end of the rod which extends downward from the lower surface of the plate 17 mounts a foot 32 for contact with the surface 14. A low pressure positioning cylinder 34 is mounted within the ground rod 28 and the piston 36 of the cylinder is secured to the top plate 35 of the base 16. A low pressure gas, usually air, is entered into each of the cylinders 34 to extend the ground rods 28 to their full extent. The pressure is sufficient to support the weight of the machine 10 that is not counterbalanced by the counterbalance unit. However, the air pressure is low enough that the operator of the drilling machine can push the base 16 downward toward the surface and tilt the base against the pressure in the positioning cylinders 34 to position the drill bit perpendicular the surface at the point to be drilled. Once this position is reached, it is locked in place by the operator activating a series of caliper brakes 38. One caliper brake is associated with each of the legs. Near each of the legs is a bar 40 which extends from the top plate 35 of the base to the lower plate 17 of the base. The caliper brakes 38 are mounted on the rods 28 and slide along the bars 40 as the rods move in and out. However, once the caliper brakes 38 are activated, pads within the brakes are squeezed against the bar 40 to prevent further movement of the rods and therefore hold the machine 10 in the desired position.

While the machine 10 is at this point properly positioned to drill the hole, the machine is not properly held in place to resist the forces exerted as the drill bit 18 begins to drill the hole 12. In order to maintain the machine fixed during the drilling operation, a series of six suction cup assemblies 42–52 are mounted on the machine 10. These suction cup assemblies will be secured to the surface 14 by a vacuum and will be pulled away from the surface with a sufficient force to hold the machine 10 rigid on the surface to be drilled.

More specifically, each of the assemblies includes a rod 54 which extends through the lower plate 17 of the base 16 and has a suction foot 56 mounted on the end of the rod. A vacuum connection 58 is provided to evacuate the underside of the suction foot 56 to provide a vacuum attachment between the foot 56 and the surface 14. The rod 54 is attached to the end of a piston 60 forming part of a double acting cylinder 62 mounted on the top plate 35 of the base. As the piston 60 is moved within the cylinder 62, the rod 54 will extend a greater or lesser distance from the bottom plate 17 of the base 16. After the legs 20–26 are locked, cylinders 62 are actuated to move suction feet 56 into contact with the surface. Once the suction feet are attached to the surface 14 by vacuum, the cylinders 62 are actuated to urge the rods 54 and suction feet 56 away from the surface, but without sufficient force to pull the suction feet 56 away from the surface. This lifting force is counteracted by the force exerted through the locked legs 20–26 on surface 14, which holds the machine 10 firmly against the surface for drilling. This holding force should at least exceed the force exerted by the drill bit 18 as it drills the hole in surface 14.

A drill spindle 64 is mounted on an edge of the base 16 for rotating the drill bit 18. A drill motor 66 rotates the spindle through a drive belt 68. The spindle 64 moves downward on the slide to extend the drill bit from the bottom plate 17 of the base 16 into contact with the surface to drill a hole. A counterbore bit 78 is formed integrally on the drill bit 18 to counterbore the hole to precisely the exact depth.

Figure 2:
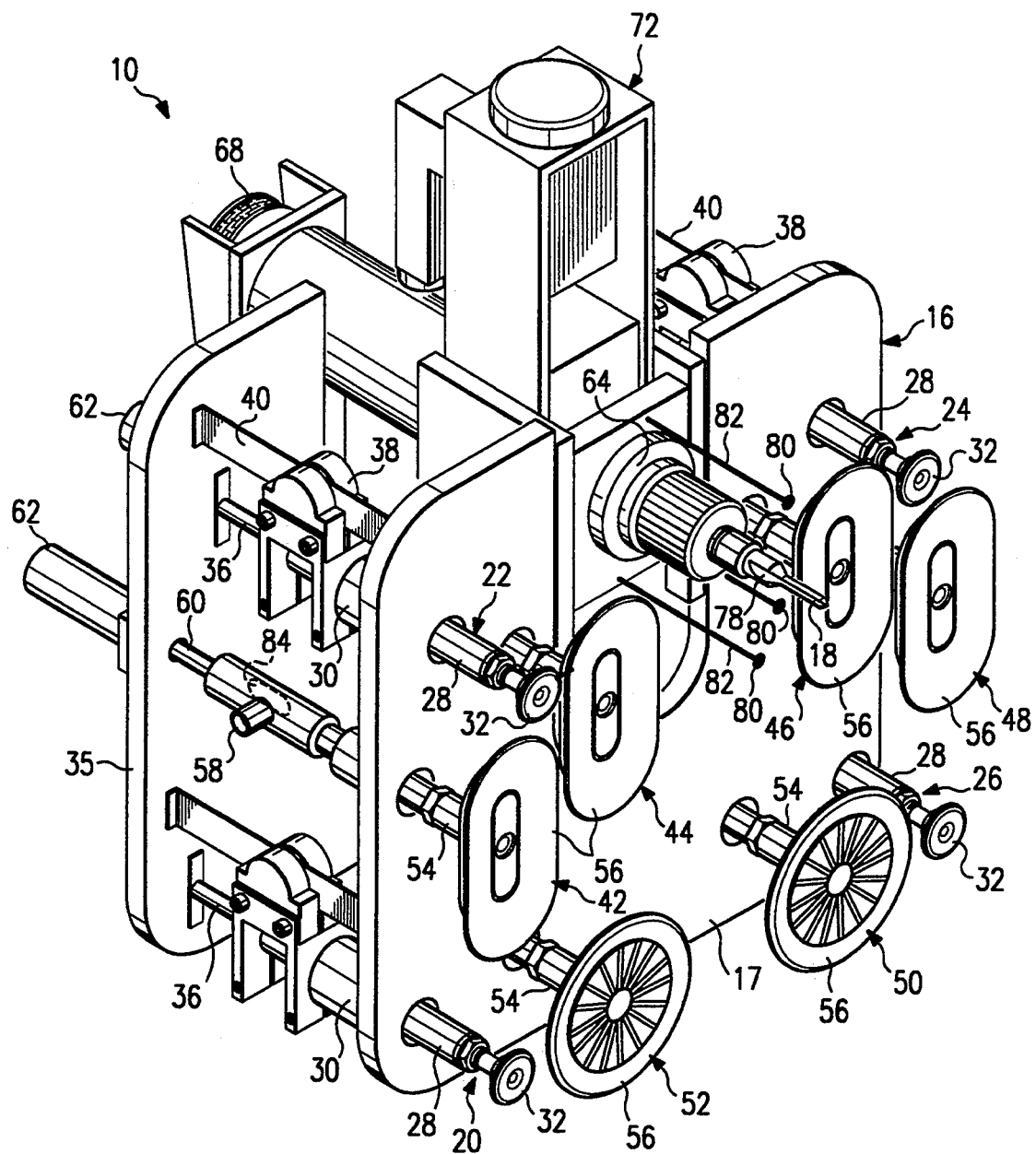
FIG. 2 is a bottom view of the drilling machine.

A periscope alignment mechanism 72 is positioned on the machine 10 so that the operator can position the drill bit precisely on a point to be drilled. The alignment mechanism 72 is pivoted to base 16 to move from the storage position shown in FIGS. 1 or 2 to a viewing position partially surrounding bit 18. Commonly, aircraft surfaces are marked with a spray paint template and a small dot of paint will be found on the surface at the point to be drilled. The periscope alignment mechanism 72 will have a lens system with crosshairs so that the operator can align the crosshairs over the paint dot when the alignment mechanism is in the viewing position and drill the hole in a proper location.

A device can be used to insure that the drill bit will enter the surface normal or perpendicular to the surface. One design for such a mechanism is a series of three copper balls 80 which are supported on legs 82 which extend downwardly from the lower plate 17 of the base 16. The balls are positioned to define a plane which is perpendicular to the drill bit 18. The three copper balls are connected electrically in series so that if all three balls simultaneously are in contact with the surface 14, usually conductive, the balls will complete a circuit telling the operator that the drill bit is perpendicular the hole to be drilled. If any of the balls is not in contact with the surface, the operator will simply move and tilt the base 16 about by compressing the pistons 36 into cylinders 34 until the alignment is achieved. Once the alignment is achieved, the operator will activate the caliper brakes 38 to lock the machine 10 in the desired position.

In one machine manufactured in accordance with the teachings of the present invention, the drill exerts a force up to 200 pounds in drilling the hole. Nitrogen gas at 750 psi is passed through the drill bit to cool and drive chips away from the drilling site as the drill is used. This high pressure nitrogen flow is also used to operate the caliper brakes 38 when they are to be locked in place. The double acting cylinders 62 are operated to exert a force tending to lift the suction feet 56 off the surface which totals about 300 pounds. This force is counteracted by an equivalent force of 300 pounds exerted between the feet 32 and the surface 14.

With a pre-tension of 300 pounds exerted between the feet 32, the force exerted by the drill bit, up to 200 pounds, will not have a tendency to shift the machine 10 from the position for drilling. In this machine, total adhesion force of up to 1,000 pounds would be possible. The motor selected for the spindle is a brushless asynchronous A.C. motor due to reduced weight and good response. The motor was an Inland Part No. BR-2101-B. The spindle feed motor will drive a 0.1 inch lead screw. The motor should be torque limited so that it cannot push the drill off the part. A typical motor drive for the spindle feed would be an Inland Model TT-2031A.

The present invention has a number of advantages. The machine 10 will retain its rigidity even while encountering drill forces of up to 200 pounds. The high precision spindle and slide on the machine provides for high quality accurate drilling. The system used to normalize the drill bit perpendicular to the surface to be drilled does not generate forces that cannot be counteracted by the operator because each of the positioning cylinders 34 has relatively low pressure. The machine is readily and easily located at the position where the hole is to be drilled. The use of a balancer suspension unit to support the majority of the weight of the machine 10 eliminates much of the stress on the positioning cylinders 34 and the double acting cylinders 62, as well as permitting the operator to move the machine with much less force than the machine actually weighs. The drill spindle 64 is mounted at one edge of the machine 10 which allows the machine to be used on the perimeter of the surface 14. The pre-tension of the vacuum units will exceed a maximum force encountered during the drilling process. Thus, the base itself will be always urged against the surface with a positive force, insuring stability of the base. The suction feet 56 are each mounted on a swivel attachment to allow the feet to conform to the surface if it is curved.

It is advisable to extend each suction cup assembly individually, in sequence. As the suction foot 56 of each suction cup assembly touches the surface, the vacuum drawn increases, tripping a vacuum switch 84. This switch reverses the air cylinder 62 and pulls the drilling machine toward the surface. The suction cup assemblies are preferably extended in sequence so that they do not overpower the operator and displace the drill.

While the invention has been described with a certain degree of particularity, it is manifest that many changes may be made in the details of construction and arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each claim thereof is entitled.

We claim:

1. A drilling platform for drilling holes in a workpiece having a surface, said drilling platform comprising:
   a base;
   a drill spindle mounted on said base;
   a plurality of extendable support legs biased to extend outwardly from said base and adapted to support said base with respect to said workpiece;
   means for locking said plurality of extendable support legs to maintain their existing degree of extension;
   at least one selectively actuatable adhesion support adapted to secure said base to said surface;
   means for actuating a first one of said selectively actuatable adhesion supports in contact with said surface to secure said first one of said selectively actuatable adhesion supports to said surface after said legs have been locked to secure said base to said surface; and means for retracting the actuated first one of said selectively actuatable adhesion supports to cause said base to press the locked support legs firmly against said surface and thereby provide a stable drilling position for said drill spindle.

2. The drilling platform of claim 1 further including a normalization sensor to determine the orientation of said base with respect to said surface of said workpiece when said plurality of extendable support legs are biased into contact with said surface.

3. The drilling platform of claim 1 further comprising fluid cylinders mounted to each of said extendable support legs to bias the extendable support legs outwardly from the base.

4. The drilling platform of claim 1 wherein said means for locking include a caliper brake mounted on said extendable support leg and a bar mounted on said base, the caliper brake being locked to the bar to lock the extendable support leg to its existing degree of extension.

5. The drilling platform of claim 1 further comprising an optical mechanism for positioning the drill spindle directly above the position on the workpiece to be drilled.

6. The drilling platform of claim 1 wherein the selectively actuatable adhesion supports include vacuum feet, said means for actuating including means for drawing a vacuum at the suction foot to adhere the foot to the workpiece.

7. A drilling platform for drilling holes in the workpiece, said drilling platform comprising:

a base;

a drill spindle having a drill bit mounted on an edge of said base;

a plurality of extendable support legs mounted to the base, each support leg including a fluid operated cylinder, a piston extending from the cylinder and secured to the base, a fluid under low pressure being provided to the cylinder to bias the extendable support legs outwardly from the base to support the base on the workpiece;

a brake mounted on each of the extendable support legs for braking action against the base;

a plurality of selectively actuatable suction cup assemblies mounted on the base, each suction cup assembly including a double acting cylinder, a piston extending from the cylinder extending outwardly from the base and a suction foot mounted on the piston;

a controller for operating the brakes to lock the extendable support legs in a position set by the operator with the drill bit normal to the surface to be drilled and sequentially extending each of the plurality of selectively actuatable suction cup assemblies into contact with the surface to adhere the assemblies to the surface and activating the double acting cylinders of the suction cup assemblies to cause the base to press the locked support legs firmly against the surface and provide a stable drilling platform for the drill spindle.

8. The drilling platform of claim 7 wherein the brakes are caliper brakes, said base having a bar extending parallel the extendable support legs to which the caliper brakes clamp.

9. The drilling platform of claim 7 further having a vacuum switch to sense vacuum at the suction foot of each of the suction cup assemblies, an increase in the vacuum as the suction foot contacts the workpiece operating the switch to supply fluid under pressure to the double acting cylinder to force the locked support legs against the workpiece.

10. A method of positioning a drilling platform on a workpiece to drill a hole with a drill bit, comprising the steps of:

positioning the drill bit at the point on the workpiece to be drilled and positioning the drill bit normal to the workpiece, the drill bit being mounted in a base having a plurality of extendable support legs biased to extend outwardly from the base and supporting the base on the workpiece, the biasing force being sufficiently low to permit the operator to counteract the biasing force to position the drill bit;

locking the extendable support legs in the position for drilling;

extending a selectively actuatable adhesion support into contact with the workpiece and actuating the adhesion support to adhere to the workpiece; and pulling the adhesion support away from the workpiece to cause the base to press the locked support legs against the workpiece and provide a stable drilling platform for the drill bit.

11. The method of claim 10 further comprising the step of sequentially extending, actuating, and pulling away a plurality of selectively actuatable adhesion supports mounted on the base.

12. The method of claim 10 further comprising the step of positioning the drill bit on the workpiece with an optical positioning sensor mounted on the drilling platform.

* * * * *